(12) United States Patent
Kussul et al.

(10) Patent No.: US 8,631,995 B2
(45) Date of Patent: Jan. 21, 2014

(54) METHOD AND DEVICE FOR MIRRORS POSITION ADJUSTMENT OF A SOLAR CONCENTRATOR

(75) Inventors: Ernst Kussul, Mexico City (MX); Tetyana Baydyk, Mexico City (MX); Felipe de Jesús Lara Rosano, Mexico City (MX); José Manuel Saniger Blesa, Mexico City (MX); Gabriel Ascanio Gasca, Mexico City (MX); Neil Charles Bruce Davidson, Mexico City (MX)

(73) Assignee: Universidad Nacional Autonoma de Mexico, Mexico City (MX)

(*) Notice: Subject to any disclaimer, the term of this patent is extended or adjusted under 35 U.S.C. 154(b) by 0 days.

(21) Appl. No.: 12/932,644

(22) Filed: Mar. 2, 2011

(65) Prior Publication Data
US 2011/0215073 A1 Sep. 8, 2011

(30) Foreign Application Priority Data
Mar. 2, 2010 (MX) .................... MX/a/2010/002418

(51) Int. Cl.
*B23K 31/02* (2006.01)
*F24J 2/12* (2006.01)

(52) U.S. Cl.
USPC .............................. 228/101; 126/690; 156/60

(58) Field of Classification Search
None
See application file for complete search history.

(56) References Cited

U.S. PATENT DOCUMENTS

| | | | | |
|---|---|---|---|---|
| 4,149,523 A | * | 4/1979 | Boy-Marcotte et al. | 126/589 |
| 4,171,876 A | * | 10/1979 | Wood | 359/853 |
| 4,295,709 A | * | 10/1981 | Wood | 359/853 |
| 4,372,772 A | * | 2/1983 | Wood | 359/847 |
| 6,302,099 B1 | * | 10/2001 | McDermott | 126/600 |
| 7,810,940 B2 | * | 10/2010 | Schramek et al. | 359/881 |
| 2007/0070531 A1 | * | 3/2007 | Lu | 359/851 |
| 2011/0041836 A1 | * | 2/2011 | Kussul | 126/690 |
| 2012/0266868 A1 | * | 10/2012 | Pedretti | 126/684 |
| 2012/0285440 A1 | * | 11/2012 | Kosaka et al. | 126/600 |
| 2012/0297622 A1 | * | 11/2012 | Ozkul | 29/890.033 |
| 2012/0298020 A1 | * | 11/2012 | Chalabi et al. | 110/346 |
| 2012/0312959 A1 | * | 12/2012 | Lorenz et al. | 250/203.4 |

FOREIGN PATENT DOCUMENTS

EP 0022887 A1 * 1/1981

OTHER PUBLICATIONS

Kussul et al. "Development of Micro Mirror Solar Concentrator", May 15-17, 2007, pp. 293-298.*
Johnston "Focal Region Measurements of the 20 M2 Tiled Dish", vol. 63, No. 2, 1998, pp. 117-124.*

* cited by examiner

*Primary Examiner* — Kiley Stoner
(74) *Attorney, Agent, or Firm* — Andrew C. Aitken

(57) ABSTRACT

The present invention consists of developing a technology with different processes to realize an optimal solar approach using a solar concentrator where distance screws are used that, when moving, allow the positioning of the mirrors whereby the reflected solar beam is directed to a focal point; the advantage of these processes is that each movement of the screws involves adjusting the position of all the neighboring mirrors, which allow a perfect alignment and adjustment of the mirrors.

8 Claims, 7 Drawing Sheets

METHOD AND DEVICE FOR MIRRORS POSITION ADJUSTMENT OF A SOLAR CONCENTRATOR

FIELD OF THE INVENTION

The present invention is to provide alignment technologies for different construction methods of parabolic solar concentrators to be used as an alternative energy source.

BACKGROUND OF THE INVENTION

There are different methods to build solar parabolic dish concentrators. One method consists of the assembly of multiple flat mirrors. To obtain a good approximation of the parabolic surface it is necessary to accurately place all the mirror vertices (eg. triangular mirrors) on the parabolic surface, for which there are different technologies.

For example, in a concentrator developed in Australia [G. Johnston, Focal region measurements of the 20 m2 tiled dish at the Australian National University, Solar Energy, Vol. 63, No. 2, pp. 117-124, 1998] they built a high-precision support of epoxy-glass with a parabolic profile. The mirrors were glued directly to the surface making impossible their adjustment after being assembled. The drawback of this method is the high cost of raw materials and the mechanic treatment process.

A method of adjusting the parabolic surface with flat mirrors focusing the focal point [EP 0022887 A1 (Douglas Wood) Jan. 28, 1981] was proposed.

The focusing process is achieved by using distance screws that allow the positioning of the mirror, whereby the reflected solar beam is directed to a focal point. The drawback of this method is that each movement of the screws involves changing the position of all neighboring mirrors, thereby complicating their adjustment.

Another method to adjust the mirrors of a solar concentrators is through a support with multiple bars and nodes [E. Kussul, T. Baidyk, O. Makeyev, E. Lara-Rosano, J. M. Saniger, N. Bruce, Development of Micro Mirror Solar Concentrator, The 2-nd IASME/WSEAS International Conference on Energy and Environment (EE'07), Portoroz (Portotose), Slovenia, May 15-17, 2007, pp. 294-299.], [E. Kussul, T. Baidyk, E. Lara-Rosano, J. M. Saniger, N. Bruce, Support Frame for Micro Facet Solar Concentrator, The 2-nd IASME/WSEAS]. However, the drawback of this device is the accumulation of small errors in the size of the bars and nodes, what will reflect in the support assembly. To obtain a good approximation of the parabolic surface it is necessary to produce bars and nodes with very strict margins of acceptable tolerance if the parabolic surface is to be corrected with some method after the assembly.

The object of the present invention is to provide a correction and adjustment technology to be used in the manufacture of parabolic surfaces for a solar concentrator, to capture as much sunlight as possible, and send this light to the solar concentrator.

DETAILED DESCRIPTION OF THE INVENTION

Figure 1:
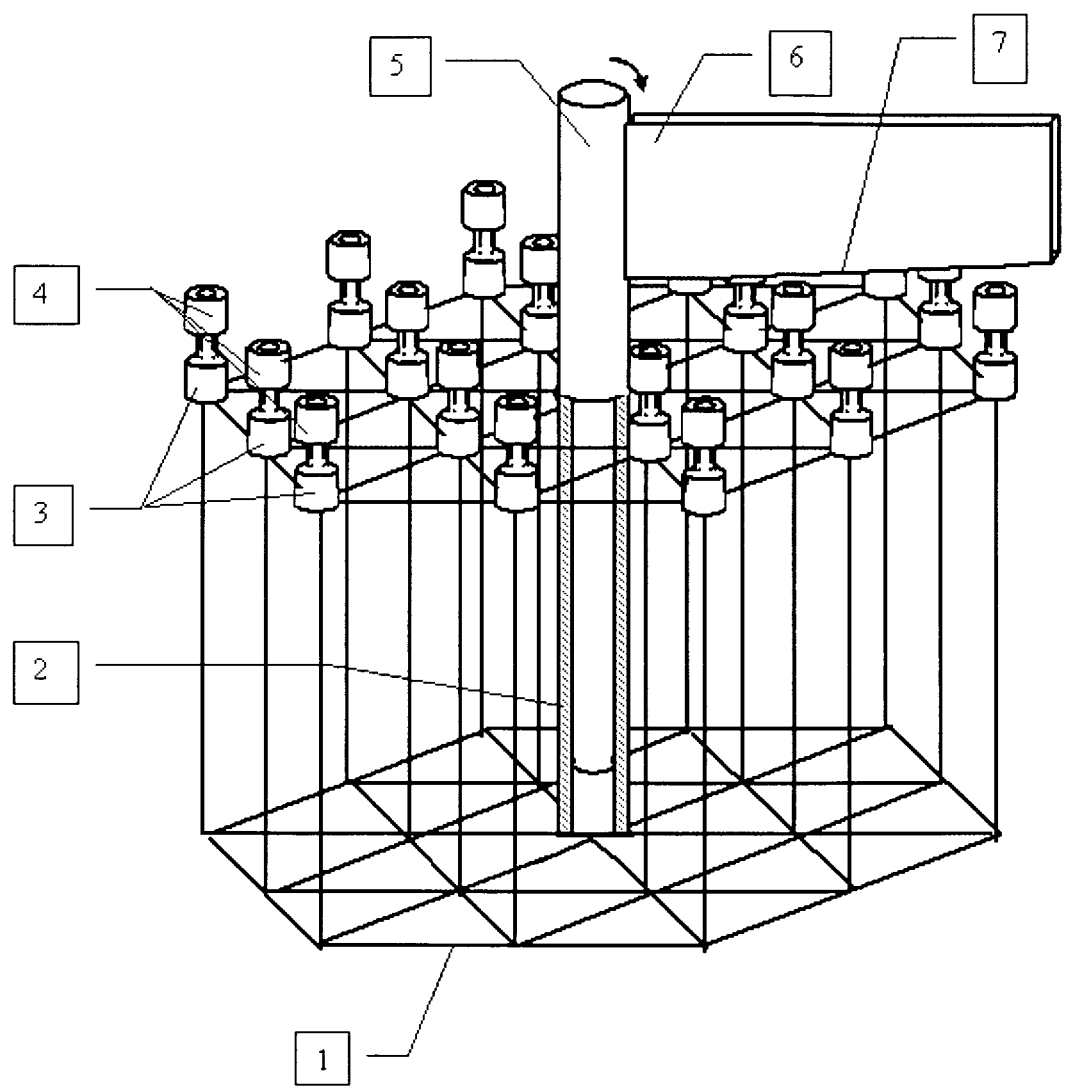
FIG. 1. Illustrates a support system with an adjustment device of parabolic surface.

The support system with an adjusting device of parabolic surface is shown in FIG. 1.

The support system includes the bars, and nodes structure (1), the central pipe (2), the hub with distance screws (3), and the nuts for the parabolic surface adjustment (4). The adjusting device includes the arrow (5), the rule (6) with bottom parabolic border (7). The rule is firmly connected to the arrow. A terminal of the central pipe (2) is connected to the grid bars at the bottom; another terminal of the central tube (2) is connected to the grid bars at the top. Each hub with distance screws (3) is firmly fixed on the top of a node of grid bars. Every nut for the adjustment of the parabolic surface (4) is placed over a distance screw (4). The arrow (5) of the adjustment device is installed within the central pipe (2).

The adjustment process of the parabolic surface consists of these steps:

1. The arrow (5) of the adjusting device is placed within the central pipe (2).
2. The rule (6) is rotated around the nuts (4) until at least one nut, which has not been adjusted yet, appears under the parabolic border (7).
3. The nut, which has not been adjusted yet, is raised (rotated around the screw) to contact the parabolic border (7).
4. The position of the nut on the screw is fixed.
5. In case that any nut is not yet adjusted, repeat step two.
6. After having adjusted all the nuts, complete the process and remove the arrow (5) of the central pipe (2).

Figure 2:
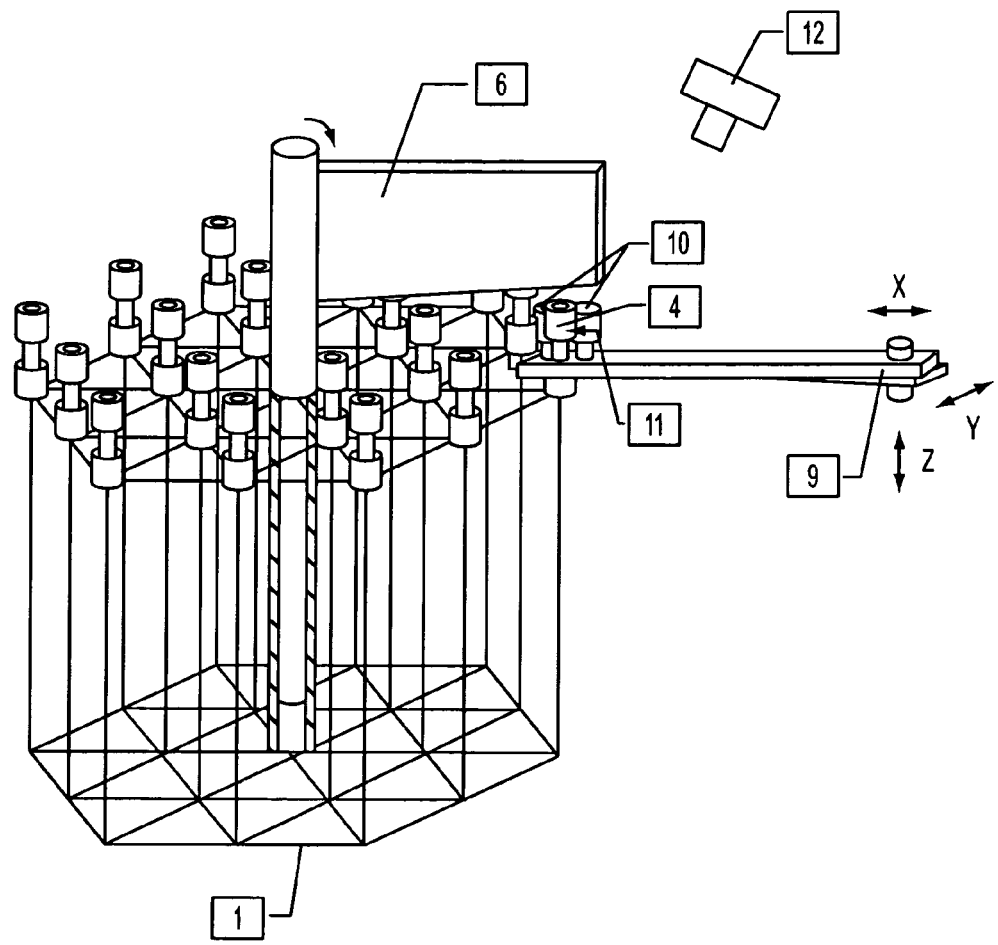
FIG. 2. Shows a robotic arm controlled by computer vision.
Figure 3:
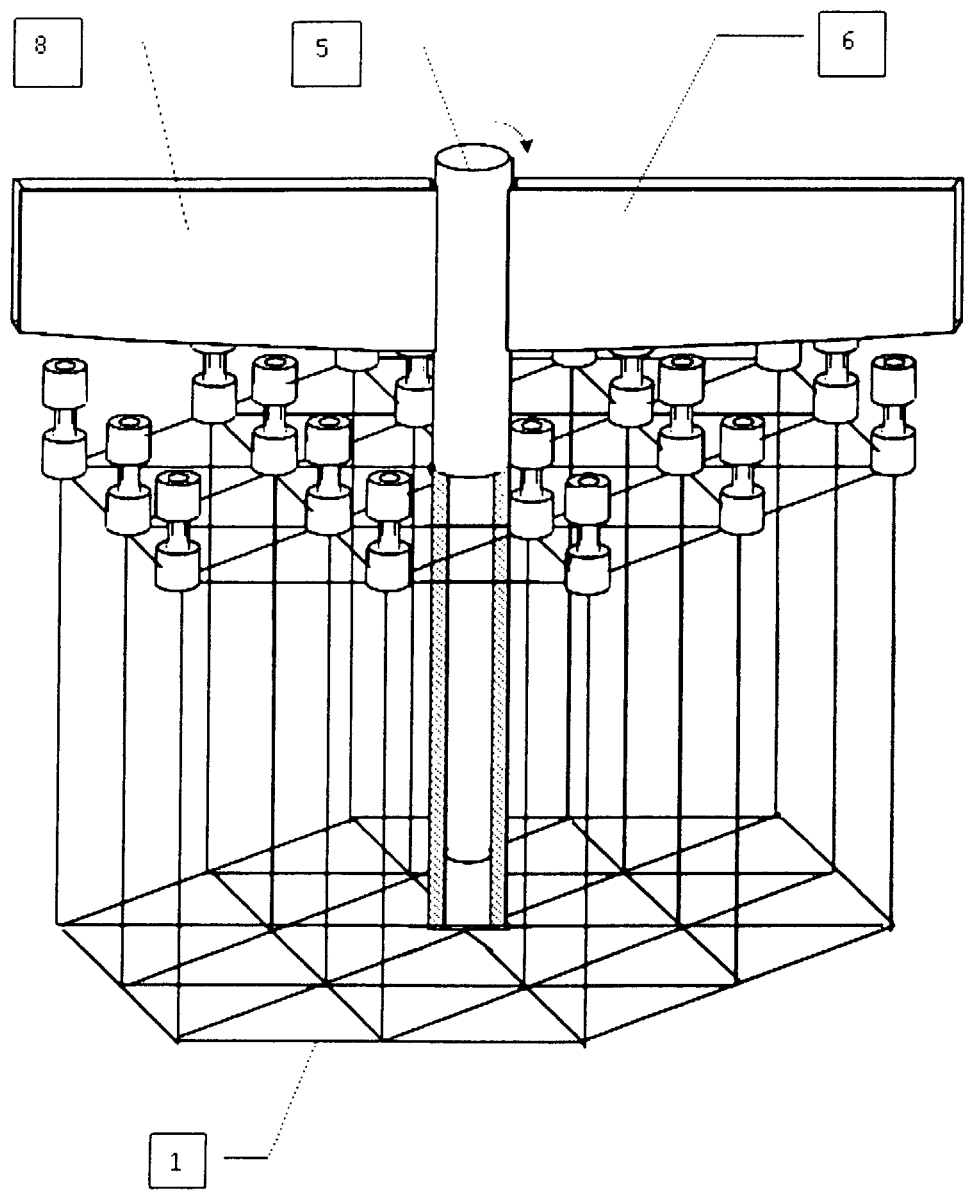
FIG. 3. Is an adjustment device with two parabolic rules.

The process of rotating the rule (step two) and adjusting the nuts positions (step three) may be done with a robotic arm controlled by computer vision. FIG. 2 shows the robotic arm clamps (9), which move along axes X, Y and Z. The clamps have two support rollers (20) and a transmission roller (11). The robotic arm is equipped with a TV camera (12). The TV camera (12) is fixed to the body of the robotic arm. The clamps are also fixed to the robotic arm (9). The robotic arm works as follows. The clamps controlled using the TV camera (12) locate the nut (4) that needs to be adjusted, and this nut is secured in turn with the support rods (10) and the transmission roller (11). The transmission roller (11) starts rotating in the direction shown with an arrow in FIG. 2, thus forcing the nut's rotation (4); with this shift, the nut (4) moves upward to contact the parabolic rule (6). It is possible to set an arrow (5) (FIG. 3), two rules (6) (8), and two automatic arms that are not shown improving thereby the process productivity. Herein, the position adjustment of the nuts can be done in parallel, beneath each parabolic rule (6) and (8). The symmetry of the supporting device, allows placing the nuts in the adjusting positions.

Figure 4:
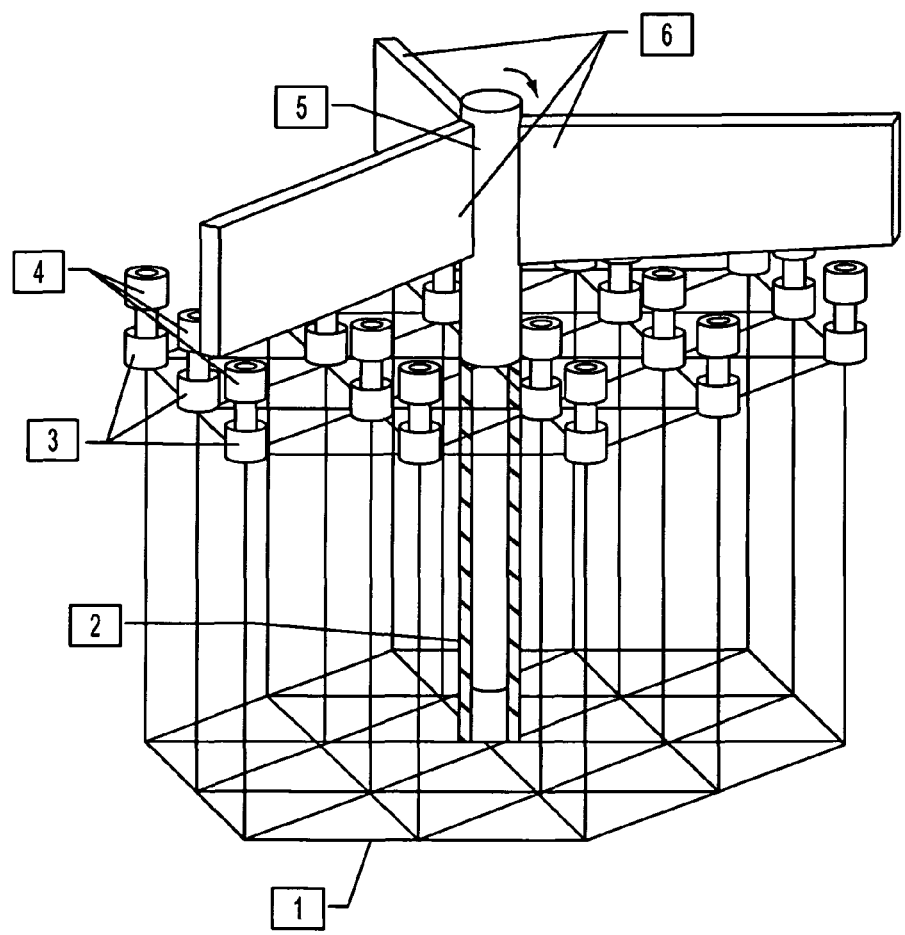
FIG. 4. Illustrates an adjustment device with three parabolic rules.

It is possible to further improvement of the productivity process by setting an arrow (5) (FIG. 4), and three rules (6), and by using three robotic arms in parallel (not shown in FIG. 4), beneath each parabolic rule (6). The symmetry of the supporting device, allows placing the nuts in the adjustment positions.

Figure 5:
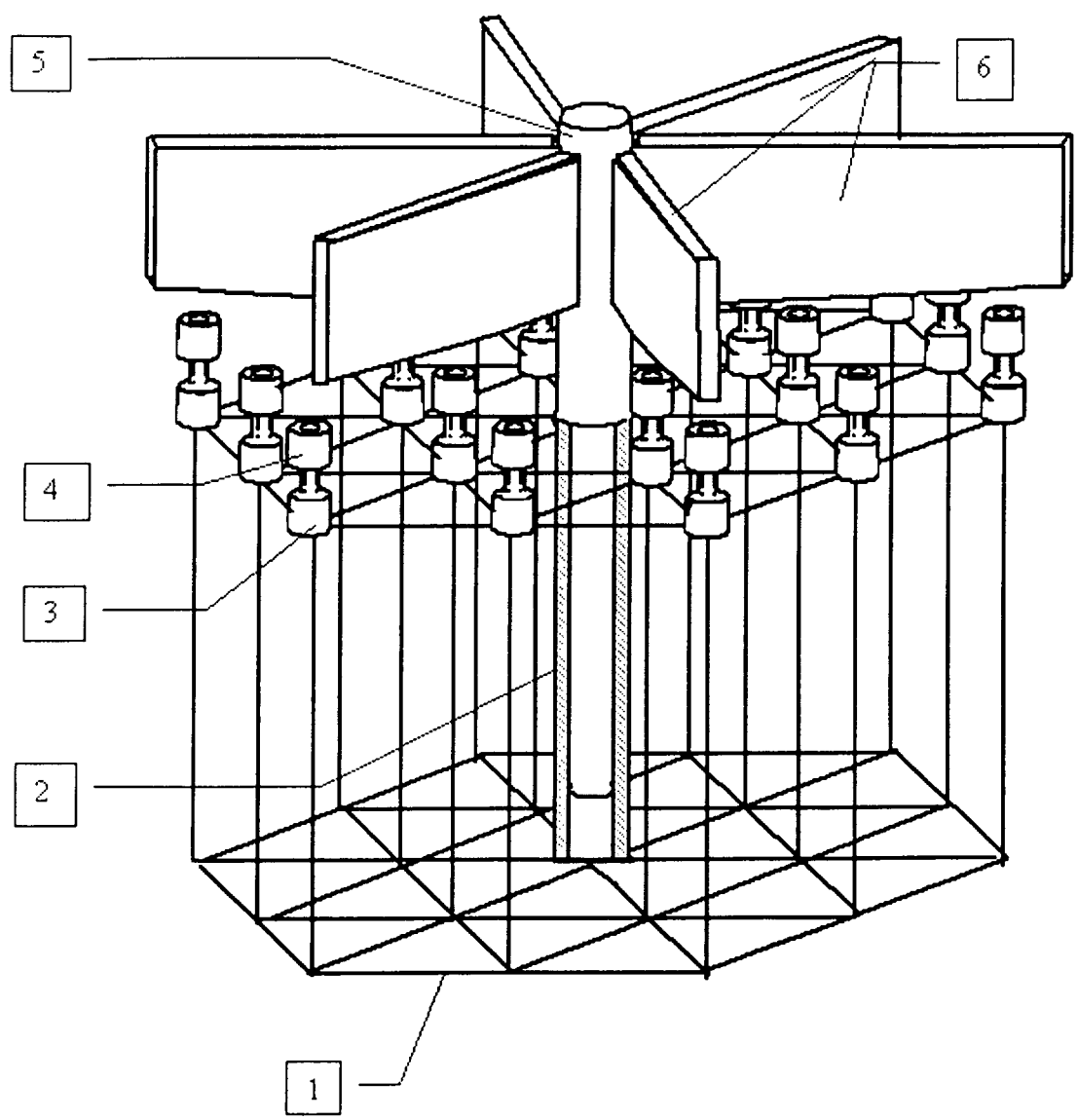
FIG. 5. Points out an adjustment device with six parabolic rules.

It is possible to further improve the productivity of the process by setting an arrow (5) (FIG. 5), six rules (6), and by using six robotic arms in parallel (not shown in FIG. 5). The symmetry of the supporting device, allows placing the nuts in the adjustment positions.

Figure 6:
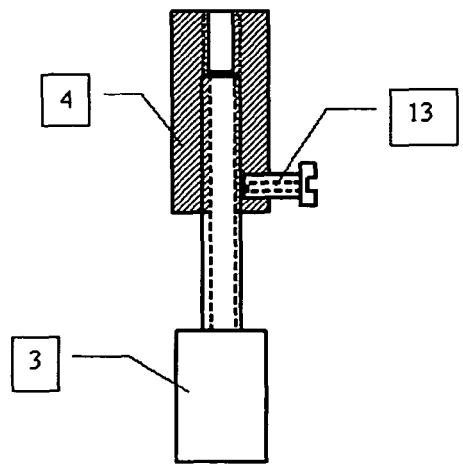
FIG. 6. Illustrates the nut adjusted by fixing screws.

It is possible to use different processes to fix the nut's position to the distance screw:

The first process is to use a fixing screw (FIG. 6); FIG. 6 shows a node to adjust the position of the triangular mirrors. This node contains a hub with a distance screw (3), a position adjustment nut (4) and a fixing screw, the position of the nut (13) The nut (4) is affixed to a hub with a distance screw (3). The fixing screw (13) is placed on the nut (4). In the adjustment process, the nut (4) is rotated around the hub with a distance screw (3) and moved upwards to contact the parabolic rule (FIG. 1), the parabolic rule (6)). Herein, he screw (13) is rotated within the nut (4) until it tightens the nut (4) to the hub with a distance screw (3).

Figure 7:
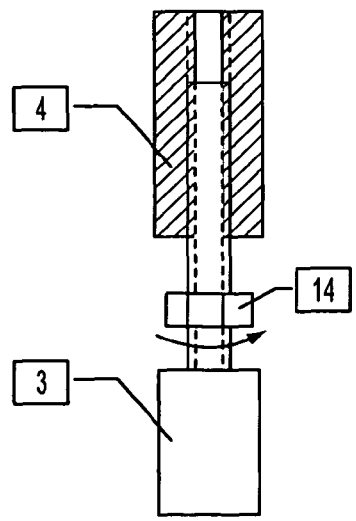
FIG. 7. Shows the nut supported by fixing nuts.

In the second process a fixing screw is used; the node is shown in FIG. 7. The node contains the hub with a distance screw (3), the nut for adjusting the position of the mirrors (4), and the fixing screw (14). The nut for adjusting the position (4) is placed on the hub with a distance screw, and the fixing screw is also placed beneath the distance screw in the hub with a distance screw (3), under the nut (4). In the adjustment process the nut (4) is rotated around the hub with a distance screw (3), and moved upwards until making contact with the parabolic rule (FIG. 1, the parabolic rule (6)). In this position, the fixing screw (14) is rotated around the hub with the distance screw (3) and is moved upwards until making contact with the nut (4), the fixing screw (14) tightens then the nut (4) to the hub with the distance screw (3). The fixing screw (14) fixes then the position of the nut (4) in relation to the hub with a distance screw (3).

Figure 8:
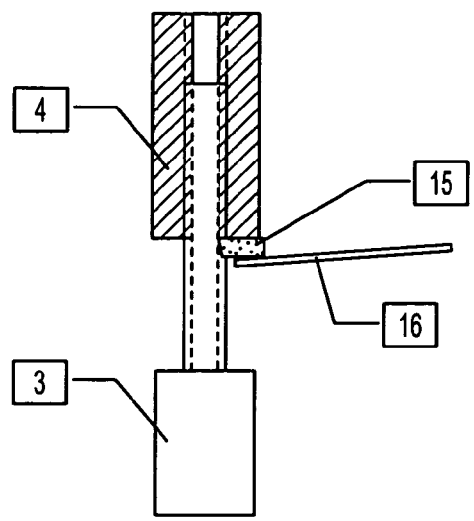
FIG. 8. Illustrates the nut fixed with adhesive.

The third process is the use of an adhesive (FIG. 8). The node contains the hub with the distance screw (3), the nut for adjusting the position of the mirrors (4), the adhesive (15), and the gluing plate (16). The nut (4) is placed in the hub with the distance screw (3), and the gluing plate (16) with adhesive (15) is placed near the nut (4). In the adjustment process, the nut (4) is rotated around the hub with a distance screw (3), and is moved upwards until making contact with the parabolic rule (FIG. 1, the parabolic rule (6)). In this position the gluing plate (16) with adhesive (15) is approached from the bottom to the nut (4), and the adhesive contacts the nut (4) with the hub with a distance screw (3). The adhesive fixes the position of the nut (4) in relation to the hub with a distance screw (3).

Figure 9:
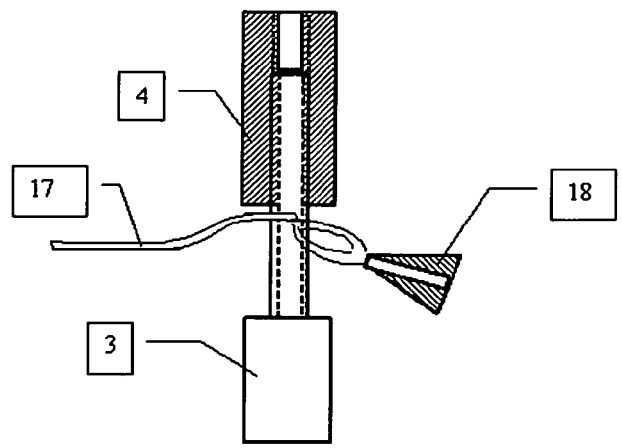
FIG. 9. Illustrates the nut fixed with welding.

The fourth process is the use of welding (FIG. 9): the node contains the hub with a distance screw (3), the nut for adjusting the position of the mirrors (4), the welding (17), and the stove (18). The node for adjusting the position of the mirrors (4) is placed on the hub with a distance screw (3); the welding (17) and the stove (18) are placed beneath the nut (4). In the adjustment process, the nut (4) is rotated around the hub with a distance screw (3), and is moved upwards until making contact with the parabolic rule (FIG. 1, the parabolic rule (6)). In this position the welding (17) is moved until making contact with the nod (4) and the hub with a distance screw); in this position, the stove (18) is turned on to heat the nut (4), the hub with a distance screw (3), and the welding until fusioning the latter. The nut (4) is in this case welded to the hub with a distance screw (3) fixing its position.

After adjusting the position of all the nuts, the triangular mirrors are placed on these nuts and automatically contact the parabolic surface. Adhesive and/or the screws that are fixed to the nuts are used to fix the mirrors.

The invention claimed is:

1. A method to adjust the parabolic surface of the mirrors in a solar concentrator wherein said solar concentrator comprises a plurality of mirrors and a plurality of concentrator nuts, the method comprising the steps of: a) Installation of a parabolic rule in a central pipe, b) rotation of said parabolic rule until one of said plurality of said concentrator nuts which have not been adjusted, is positioned beneath said parabolic rule, c) rotation of said concentrator nut beneath said parabolic rule to move said concentrator nut upwards until making contact with said parabolic rule to thereby perform an adjustment of said concentrator nut, d) fixing said nut's position in relation to a distance screw, and e) if there still are nuts that have not been adjusted yet, repeat steps a through d.

2. A method to adjust the parabolic surface of mirrors in a solar concentrator as recited in claim 1 wherein said concentrator nuts are rotated with a robotic arm.

3. A method to adjust the parabolic surface of mirrors in a solar concentrator as recited in claim 1 wherein said adjustments are made by more than one robotic arm and more than one parabolic rule and said adjustment of more than one of said concentrator nut is performed simultaneously.

4. The method to adjust the parabolic surface of mirrors in a solar concentrator as recited in claim 3 further comprising the use of two parabolic rules and two robotic arms to make the adjustment of two concentrator nuts simultaneously.

5. A method to a adjust the parabolic surface of mirrors in a solar concentrator as recited in claim 3 wherein three parabolic rules and three robotic arms make the adjustment of the nuts simultaneously.

6. A method to adjust the parabolic surface of mirrors in a solar concentrator as recited in claim 1 wherein the position of said concentrator nut is fixed with a fixing screw that engages a distance screw.

7. A method to adjust the parabolic surface of mirrors in a solar concentrator as recited in claim 1 wherein the position of said concentrator nut is fixed to said distance screw with an adhesive.

8. A method to adjust the parabolic surface of mirrors in a solar concentrator as recited in claim 1 wherein the position of the nut is fixed to the distance screw by welding.

* * * * *